(12) United States Patent
Nishiyama

(10) Patent No.: US 9,131,077 B2
(45) Date of Patent: Sep. 8, 2015

(54) COMMUNICATION APPARATUS AND CONTROL METHOD OF COMMUNICATION APPARATUS TO ASSESS A DATA RECEPTION STATE OF A RECEIVING APPARATUS

(71) Applicant: KYOCERA Document Solutions Inc., Osaka (JP)

(72) Inventor: Masahiro Nishiyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/460,220

(22) Filed: Aug. 14, 2014

(65) Prior Publication Data
US 2015/0055191 A1    Feb. 26, 2015

(30) Foreign Application Priority Data
Aug. 26, 2013   (JP) ................................ 2013-174756

(51) Int. Cl.
*H04N 1/00* (2006.01)
*H04N 1/32* (2006.01)

(52) U.S. Cl.
CPC ........... *H04N 1/00114* (2013.01); *H04N 1/001* (2013.01); *H04N 1/00931* (2013.01); *H04N 1/00954* (2013.01); *H04N 1/32074* (2013.01); *H04N 2201/0039* (2013.01); *H04N 2201/0093* (2013.01); *H04N 2201/0094* (2013.01)

(58) Field of Classification Search
CPC .................................................. H04N 1/32074
USPC .................... 358/1.15, 400; 714/E11.024, 37
See application file for complete search history.

(56) References Cited

U.S. PATENT DOCUMENTS

| | | | |
|---|---|---|---|
| 2004/0027603 A1* | 2/2004 | Ueda et al. .................... | 358/1.14 |
| 2004/0075871 A1* | 4/2004 | Itoh ............................... | 358/440 |
| 2012/0166881 A1* | 6/2012 | Nakayama ...................... | 714/37 |
| 2013/0100478 A1* | 4/2013 | Ogasawara ................... | 358/1.14 |

FOREIGN PATENT DOCUMENTS

JP       2005-236438 A     9/2005

* cited by examiner

*Primary Examiner* — Jacky X Zheng
(74) *Attorney, Agent, or Firm* — Stein IP, LLC

(57) ABSTRACT

A communication apparatus includes a storage unit, a processing unit, and a communication unit. The storage unit includes a communication storage area for storing communication data, which stores relevant information indicating a time when the reception disabled state is resolved for each of factors of the reception disabled state. The processing unit determines a current factor of the reception disabled state and calculates a reception enabled time until being a reception enabled state by resolving the reception disabled state based on the relevant information corresponding to the determined one or more factors. When data reception from the other party is disabled, the communication unit transmits the reception enabled time calculated by the processing unit as a wait time until the communication apparatus of the other party sends a request to start communication again.

9 Claims, 9 Drawing Sheets

FIG.9

| FACTOR OF DISABLED | RELEVANT INFORMATION |
|---|---|
| RUNNING OUT OF PAPER SHEET | SUPPLY TIME INFORMATION (WORKING HOURS) (EXAMPLE) WORKING HOURS 8:30 TO 17:30 |
| ACCUMULATION OF RECEIVED IMAGE DATA | DELETE TIME INFORMATION (KEEP PERIOD, AUTOMATIC DELETION TIME) |
| UNTRANSMITTED IMAGE DATA | TRANSMISSION START TIME INFORMATION REDIAL TIME INFORMATION |
| PRINT INHIBITION SETTING | SPECIFIC TIME PERIOD INFORMATION |
| PRIORITY MODE | PRIORITY MODE INFORMATION |

FIG.10A

BOX SETTING
AUTOMATIC DELETION OF TEMPORARILY STORED DOCUMENT

RECEIVED IMAGE DATA
- ☐ NO SETTING
- ☐ ONE DAY
- ☐ ONE HOUR
- ☐ ONE WEEK
- ☐ FOUR HOURS
- ☐ DELETE AFTER PRINTING

CANCEL   OK

FIG.10B

BOX SETTING
SETTING OF AUTOMATIC DELETION TIME OF DOCUMENT

SET TIME FOR AUTOMATIC DELETION OF STORED DOCUMENT

TIME: 21
MINUTE: 30

K2—[ − ][ + ]—K1   K2—[ − ][ + ]—K1
TEN-KEY              TEN-KEY

CANCEL   OK

COMMUNICATION APPARATUS AND CONTROL METHOD OF COMMUNICATION APPARATUS TO ASSESS A DATA RECEPTION STATE OF A RECEIVING APPARATUS

CROSS-REFERENCE TO RELATED APPLICATIONS

This application is based upon and claims the benefit of priority from the corresponding Japanese Patent Application No. 2013-174756, filed Aug. 26, 2013, the entire contents of which are incorporated herein by reference.

BACKGROUND OF THE INVENTION

1. Field of the Invention

The present disclosure relates to a communication apparatus for performing data transmission and reception such as facsimile,communication.

2. Description of the Related Art

For instance, a communication apparatus such as a facsimile apparatus or a smart phone transmits and receive image data. In data transmission and reception, reception side communication apparatus (reception side apparatus) may become a state that cannot receive data because of a certain cause. In the data reception disabled state, a notice of the data reception disabled state may be sent to a transmission side communication apparatus (transmission side apparatus). In addition, in order to prevent wasteful repeat of calling, the reception side apparatus may inform the transmission side apparatus of a time for the transmission side apparatus to perform request to start communication again (redial).

There is known the following facsimile apparatus that informs about a time to perform redial. Specifically, there is described a facsimile apparatus that supports output disable setting (print out disable setting) in a specific period (night, holiday, and the like) and SIP. When a reception operation is started and a memory full state occurs during the output disabled period, information of time to become an output enabled state is sent to the transmission side. With this structure, wasteful calling by the transmission side is suppressed when a memory reception disabled state in the memory full state occurs during the specific output disabled period.

In this way, when data cannot be received (data communication cannot be started) because of circumstances of the reception side apparatus, the reception side apparatus informs the transmission side apparatus of the reception disabled state and may add information indicating the time for the transmission side apparatus to send request to start communication again to the information of the reception disabled state.

There are various causes of the reception disabled state of the reception side apparatus. For instance, as a cause of the reception disabled state, there is a memory full state (in which a memory for data reception is full or almost full). In addition, there are other causes of the reception disabled state without limiting to the memory full state. In addition, there are various causes of the memory full state and various causes of resolving the memory full state (deletion of data in the memory for communication).

However, conventionally, without considering factors in detail in such a manner that the memory full state needs seconds or a factor other than the memory full state needs seconds, the time until sending the request to start communication again is informed to the transmission side apparatus. Therefore, there is a case where the transmission side apparatus sends the request to start communication again when a long time has elapsed after the reception side apparatus becomes reception enabled state. Therefore, there is a problem that the data, which was not received because of the reception disabled state, cannot be received without delay (promptly) when the reception enabled state is restored. On the contrary, the transmission side apparatus has to wait the specified time even if the reception side apparatus restores the reception enabled state. As the informed wait time is longer, it is necessary to keep the data for longer time, which was not transmitted for the reception disabled state. Therefore, there is a problem that the data waiting for being sent continues to occupy a communication storage area in the memory.

Here, in the known facsimile apparatus described above, when the memory full state occurs in the specific period (time period) in which the output disable setting is made, the transmission side apparatus is informed of the time to be the output enabled state. However, it is not considered to resolve the memory full state due to a reason other than the specific period. Therefore, even if the reception enabled state is restored before the specific period is finished, the data is not sent from the transmission side apparatus until day off ends or until the service starts the next day. Therefore, there is a problem that it may take long time from being the reception enabled state to actual reception of data. In addition, the transmission side apparatus has to keep the untransmitted data for long period until day off ends or until the service starts the next day. Therefore, there is also a problem that the transmission side apparatus is capable to cause the memory full state on the contrary.

SUMMARY OF THE INVENTION

A communication apparatus according to a first aspect of the present disclosure includes a storage unit, a processing unit, and a communication unit. The storage unit includes a communication storage area for storing communication data with a communication apparatus of the other party, which stores relevant information indicating a time until a reception disabled state is resolved for each factor of the reception disabled state. The processing unit determines whether or not data reception from the communication apparatus of the other party is enabled, analyzes factors of the reception disabled state so as to determine a factor of the current reception disabled state among a plurality of factor candidates, obtains the relevant information corresponding to the determined one or more factors from the storage unit, and calculates a reception enabled time until the reception disabled state is resolved so that the data reception can be performed based on the obtained relevant information. The communication unit performs data transmission and reception using a network. When data reception from the communication apparatus of the other party cannot be performed, the communication unit sends notification including an instruction of wait time for the communication apparatus of the other party to send a request to start communication again, and sends the reception enabled time calculated by the processing unit as the wait time.

Further features and advantages of the present disclosure will become apparent from the description of embodiments given below.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 9 is a table showing factors of a reception disabled state and relevant information to be referred to in accordance with the factor.

FIGS. 10A and 10B are diagrams illustrating automatic deletion setting screens of image data stored in a communication storage area after being received by facsimile communication.

DETAILED DESCRIPTION OF THE EMBODIMENTS

Now, an embodiment of the present disclosure is described with reference to FIG. 1 to FIG. 8. Here, in this description, as an apparatus performing transmission and reception of data according to the present disclosure, a communication apparatus 1 having a facsimile communication function is exemplified and described. Specifically, as an example of this communication apparatus 1, a multifunction peripheral 100 (corresponding to an image forming apparatus) is exemplified and described. However, elements such as structures and layouts described in this embodiment do not limit the scope of the disclosure and are merely examples for description.

(Outline of Communication System 1000)

Figure 1:
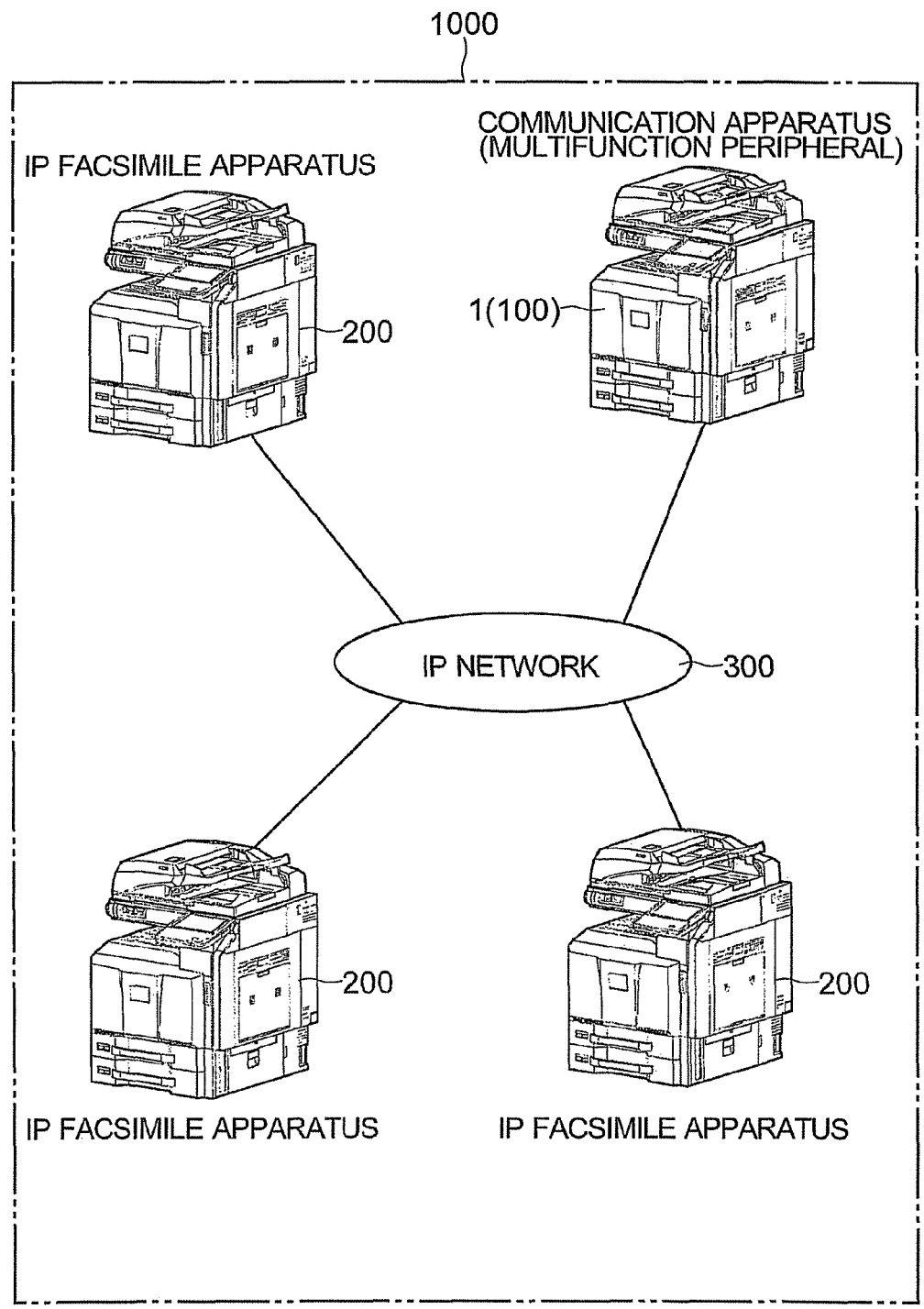
FIG. 1 is a diagram illustrating a communication system.

First, with reference to FIG. 1, outline of a communication system 1000 including the communication apparatus 1 and the multifunction peripheral 100 according to the embodiment is described.

The communication system 1000 is constituted of the multifunction peripheral 100 (corresponding to the image forming apparatus) connected to an IP network 300 (corresponding to a network), a plurality of IP facsimile apparatuses 200 (corresponding to communication apparatuses of the other party), and the like. For convenience sake, FIG. 1 illustrates the three IP facsimile apparatuses 200, but the number of the IP facsimile apparatuses 200 may be two or smaller, or four or more.

The multifunction peripheral 100 has a plurality of functions such as a print function, a transmission function, a facsimile communication function, and a scan function. Further, the multifunction peripheral 100 according to this embodiment is connected to the IP network 300 in a communicable manner. The multifunction peripheral 100 can perform facsimile communication via the IP network 300 with each IP facsimile apparatus 200 connected to the IP network 300. In this way, the multifunction peripheral 100 (communication apparatus 1) is also the IP facsimile apparatus 200.

In addition, each IP facsimile apparatus 200 may be the one similar to the multifunction peripheral 100 of this embodiment, having the plurality of functions such as the print function, the transmission function, and the scan function (FIG. 1 illustrates the same type as the multifunction peripheral 100). In addition, each IP facsimile apparatus 200 may be a special purpose machine having only the facsimile function. Further, one of the IP facsimile apparatuses 200 can perform facsimile communication with the multifunction peripheral 100 or the other IP facsimile apparatus 200. The facsimile data transmitted and received by the facsimile communication is image data in an example of this embodiment.

Further, in the following description, as the apparatus performing communication, the multifunction peripheral 100, and the IP facsimile apparatuses 200 are exemplified. As the communication network, the IP network 300 is exemplified. However, the apparatus performing data communication (facsimile communication) is not limited to the IP facsimile apparatus 200, and the communication path is not limited to the IP network 300.

(Outline of Multifunction Peripheral 100)

Figure 2:
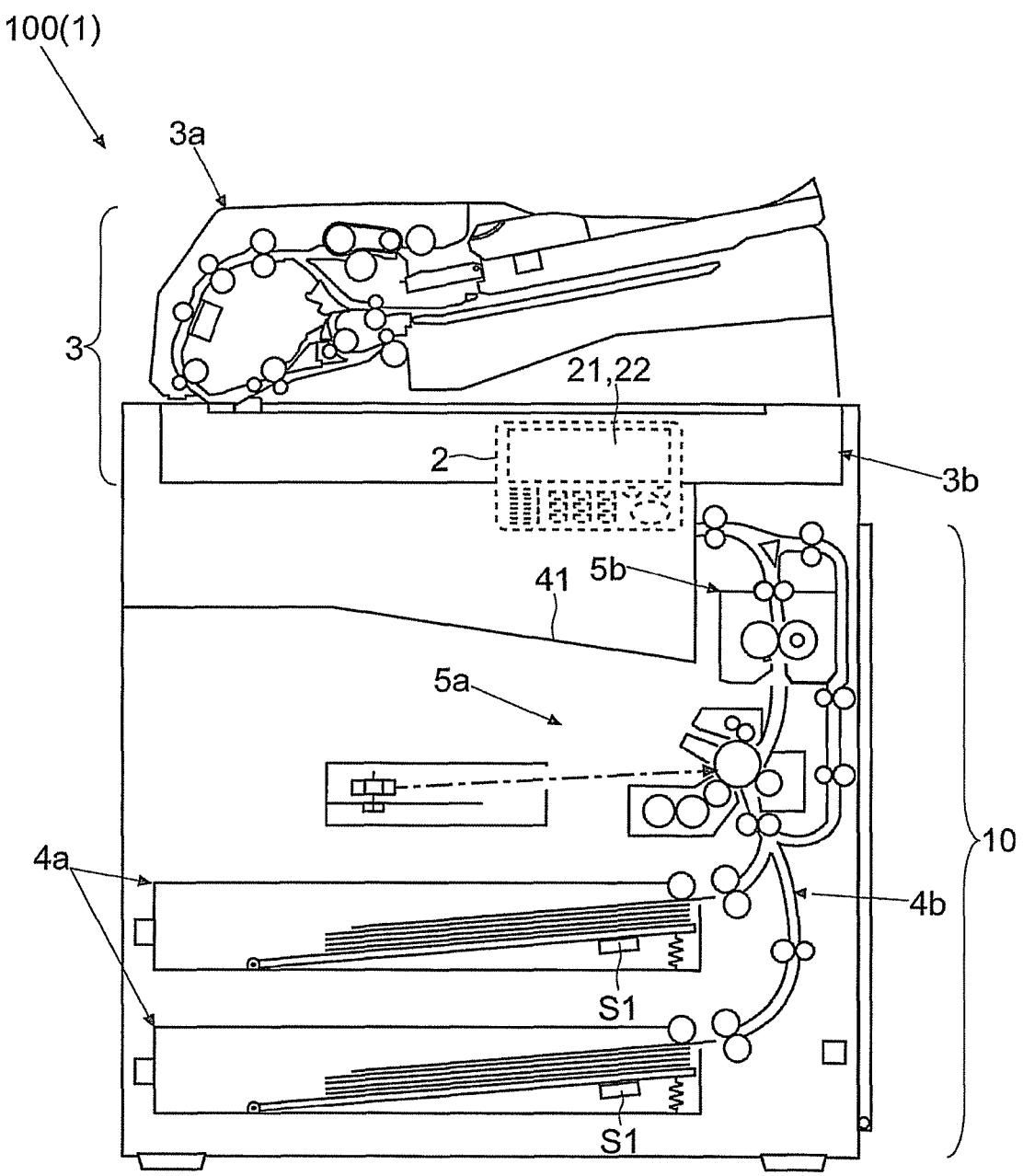
FIG. 2 is a diagram illustrating a structure of a multifunction peripheral.

Next, with reference to FIG. 2, outline of the multifunction peripheral 100 according to the embodiment is described.

As illustrated in FIG. 2, the multifunction peripheral 100 of this embodiment includes the operation panel 2 attached to the front. Further, the multifunction peripheral 100 includes a reading unit 3 disposed on an upper part, which is constituted of a document transport unit 3a and an image reading unit 3b. In addition, the multifunction peripheral 100 includes a printing unit 10 inside, which includes a paper sheet feeder 4a, a transport unit 4b, an image forming unit 5a, and a fixing unit 5b.

First, the operation panel 2 includes a display unit 21 for displaying a status of the multifunction peripheral 100, various messages, and a setting screen. In addition, there is disposed a touch panel unit 22 for recognizing whether or not a display position of a key or button is touched with respect to the display unit 21. The operation panel 2 accepts setting of transmission or printing conditions based on an output of the touch panel unit 22, which includes a transmission method, a transmission destination address, a size and a type of paper sheets, a size and a type of a document.

When document sheets are transported and read, the document transport unit 3a transports the document sheets set on a document tray to a reading position one by one. The image reading unit 3b reads the transported document sheet or a document placed on a document table so as to generate document image data.

The paper sheet feeder 4a stores a plurality of paper sheets and sends out the paper sheet in printing job. The transport unit 4b transports the supplied paper sheet to a discharge tray 41. The image forming unit 5a forms a toner image based on image data and transfers the toner image onto the paper sheet. The fixing unit 5b fixes the toner image to the transferred paper sheet with the transferred toner image. The paper sheet after passing through the fixing unit 5b is discharged onto the discharge tray 41. In this way, printing of one page is completed.

(Hardware Structure of Multifunction Peripheral 100)

Figure 3:
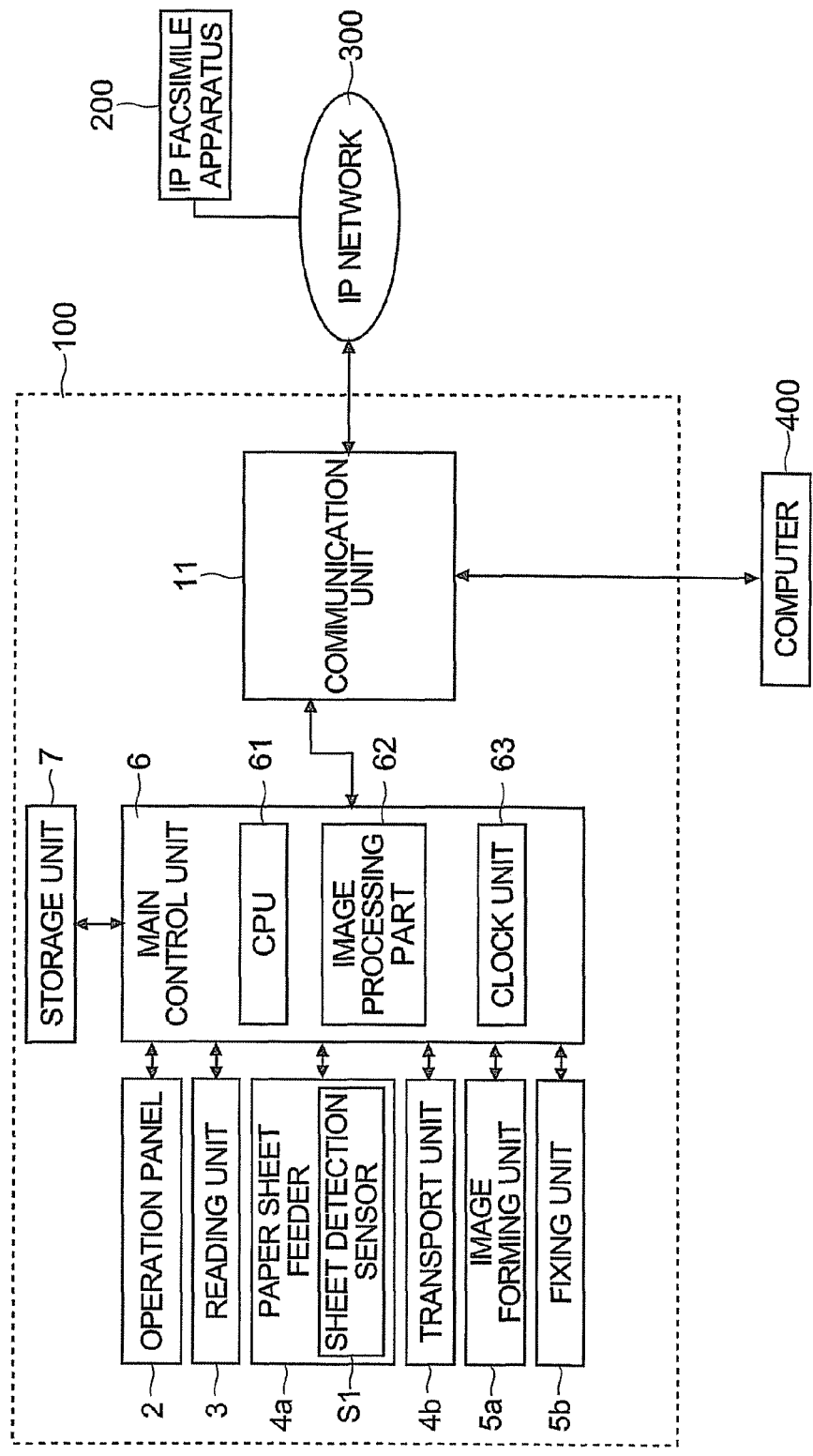
FIG. 3 is a diagram illustrating a hardware structure of the multifunction peripheral.

Next, with reference to FIG. 3, a hardware structure of the multifunction peripheral 100 according to the embodiment is described.

As illustrated in FIG. 3, the multifunction peripheral 100 includes a main control unit 6 (corresponding to a processing unit). The main control unit 6 controls individual units included in the multifunction peripheral 100. The main control unit 6 includes a CPU 61, an image processing part 62 for generating image data used for printing or transmission (including facsimile communication), and other electronic circuit or element. In addition, the main control unit 6 is provided with a clock unit 63 for measuring time. The clock unit 63 measures various times necessary for control by the main control unit 6. Note that the CPU 61 may perform clocking. The CPU 61 controls individual units of the multifunction peripheral 100 and performs calculation based on control programs and control data stored in a storage unit 7. The storage unit 7 is a combination of storage devices such as a RAM 71, a ROM 72, and an HDD 73 (see FIG. 5).

In addition, the main control unit 6 controls operation of the printing unit 10 that performs printing by paper sheet transportation, toner image formation, transferring, and fixing, and operation of the reading unit 3. Note that the paper sheet feeder 4a of the multifunction peripheral 100 is provided with a paper sheet detection sensor S1 (for example, a photosensor) for detecting whether or not there is no paper sheet in the paper sheet feeder 4a (whether or not paper sheet runs out). The output of the paper sheet detection sensor S1 is different between a case where there is paper sheet and a case where there is no paper sheet. The main control unit 6 recognizes whether or not the paper sheet runs out based on the output of the paper sheet detection sensor S1. In addition, the main control unit 6 controls operation of display or the like of the operation panel 2. In addition, the main control unit 6 recognizes content of setting made by the operation panel 2 and recognizes content of job, setting and execution instruction.

In addition, the main control unit 6 is connected to a communication unit 11. The main control unit 6 controls operation and communication process of the communication unit 11. The communication unit 11 is an interface for performing communication with a computer 400 such as a personal computer or a server. In addition, the communication unit 11 performs facsimile communication via the IP network 300 with each IP facsimile apparatus 200. The communication unit 11 performs communication via a network, a connection cable, and the like.

The communication unit 11 can transmit image data based on reading of a document by the reading unit 3 to the computer 400 and each IP facsimile apparatus 200 (transmission function). When performing transmission to each IP facsimile apparatus 200 (when an execution instruction of the facsimile communication is issued), the main control unit 6 generates data of a format set by the operation panel 2. Further, the main control unit 6 controls the communication unit 11 to transmit the generated data to the transmission destination set by the operation panel 2.

In addition, the communication unit 11 receives print data (including image data and print setting) from the computer 400 and image data from each IP facsimile apparatus 200. Further, the main control unit 6 controls the printing unit 10 to perform printing based on the received print data and image data (printer function and facsimile reception function).

(Communication Apparatus 1)

Figure 4:
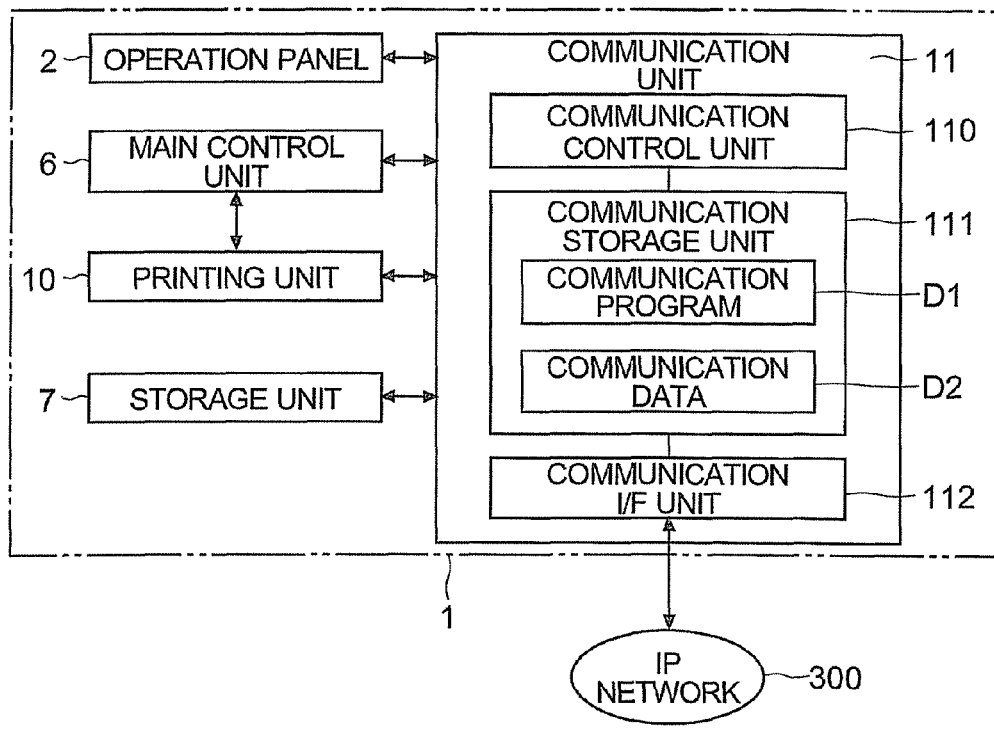
FIG. 4 is a diagram illustrating a communication apparatus.

Next, with reference to FIG. 4, the communication apparatus 1 included in the multifunction peripheral 100 is described.

As illustrated in FIG. 4, the multifunction peripheral 100 includes the communication unit 11 for performing communication via the IP network 300 with each IP facsimile apparatus 200 of the other party. The communication unit 11 includes a communication control unit 110, a communication storage unit 111, a communication I/F unit 112, and the like.

The communication control unit 110 includes a control CPU, a calculation circuit, and the like. The communication control unit 110 controls transmission and reception of a request, a response, data, and the like via the IP network 300 based on an instruction from the main control unit 6. In this way, the communication control unit 110 actually controls operation and process of the communication unit 11.

The communication storage unit 111 stores a communication program D1 and communication data D2. The communication control unit 110 performs a process concerning communication based on the communication program D1 and the communication data D2 stored in the communication storage unit 111. In addition, the communication storage unit 111 can be used as a buffer of data transmitted by facsimile. The communication I/F unit 112 is an interface including a signal processing circuit, a connector and a socket to which a cable is attached for connecting to the IP network 300.

When performing facsimile transmission (when the multifunction peripheral 100 is a transmission source and performs facsimile communication with each IP facsimile apparatus 200), the main control unit 6 generates image data for facsimile transmission based on image data obtained by reading a document. The image data for facsimile transmission is temporarily stored in the storage unit 7. In addition, the main control unit 6 instructs the communication control unit 110 to transmit the image data to the transmission destination (transmission destination address) set by the operation panel 2.

The communication control unit 110 controls the communication I/F unit 112 to send a request to start communication to a facsimile number (address) set by the operation panel 2. Next, the communication control unit 110 controls the communication I/F unit 112 to perform a predetermined communication protocol with the IP facsimile apparatus 200 of the other party. When receiving communication permission (reception permission) from the IP facsimile apparatus 200 of the other party so as to establish a session with the other party, the communication control unit 110 controls the communication I/F unit 112 to sequentially transmit image data in the storage unit 7.

On the other hand, when performing facsimile reception (when the multifunction peripheral 100 receives facsimile communication from one of the IP facsimile apparatuses 200), the communication control unit 110 performs a predetermined communication protocol with the IP facsimile apparatus 200 of the other party. Then, the communication control unit 110 controls the communication I/F unit 112 to transmit communication permission to the IP facsimile apparatus 200 of the other party. Then, session with the facsimile apparatus of the other party is established. After the session is established, the communication control unit 110 receives image data transmitted from the IP facsimile apparatus 200, and the received image data is sequentially transferred to the storage unit 7. The received image data is temporarily stored in the storage unit 7 and is used for printing or the like.

In this way, the communication unit 11, the main control unit 6, the operation panel 2, the storage unit 7, and the like in the multifunction peripheral 100 work as the communication apparatus 1. In other words, the multifunction peripheral 100 includes the communication apparatus 1.

(Structure of Storage Unit 7)

Figure 5:
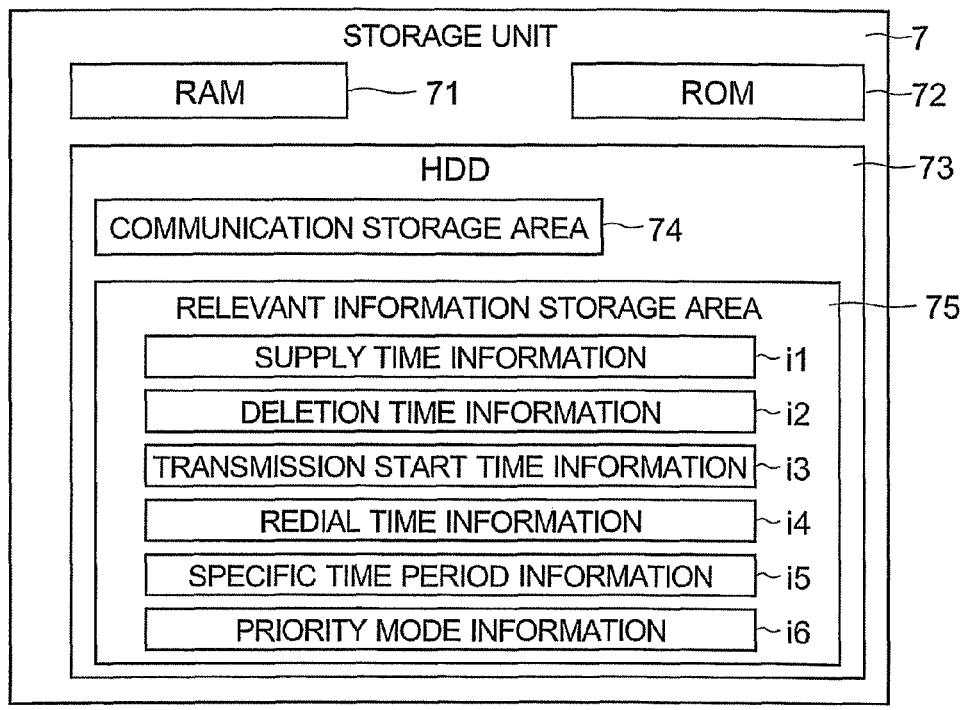
FIG. 5 is a diagram illustrating a structure of a storage unit.

Next, with reference to FIG. 5, the storage unit 7 of the communication apparatus 1 according to this embodiment is described.

The storage unit 7 of the communication apparatus 1 includes the RAM 71, the ROM 72, and the HDD 73. The RAM 71 temporarily stores the communication program and data, image data transmitted in the facsimile communication, and image data received in the facsimile communication in a volatile manner. In addition, the ROM 72 stores a program and data for starting the main control unit 6 and the communication unit 11, and a program and data necessary for controlling the multifunction peripheral 100 and the communication apparatus 1 in a nonvolatile manner. Further, the HDD 73 includes a communication storage area 74 for storing image data to be transmitted in the facsimile communication and image data received in the facsimile communication in a nonvolatile manner. The communication storage area 74 is allocated as a part of the storage area of the HDD 73. The communication storage area 74 is a storage area for storing data concerning the transmission and reception in the facsimile communication with each IP facsimile apparatus 200, such as image data. In other words, the communication storage area 74 is a storage area for facsimile communication. Note that a size of the communication storage area 74 may be changed by input to the operation panel 2. It is possible to dispose a nonvolatile storage device such as a flash ROM, and to use the storage device such as a flash ROM as the communication storage area 74.

In addition, as illustrated in FIG. 5, the HDD 73 of the storage unit 7 includes a relevant information storage area 75 as a part for storing relevant information for determining a time when the reception disabled state is resolved. The relevant information storage area 75 stores a plurality of information sets such as supply time information i1 (corresponding to the relevant information), deletion time information i2 (corresponding to the relevant information), transmission start time information i3 (corresponding to the relevant information), redial time information i4 (corresponding to the relevant information), specific time period information i5 (corresponding to the relevant information), priority mode information i6 (corresponding to the relevant information), and the like. Note that the contents stored in the relevant information storage area 75 may be stored in the ROM 72, or the communication storage area 74, and is stored in one place of storage unit 7 in a nonvolatile manner.

(Communication Sequence of Communication Apparatus 1)

Figure 6:
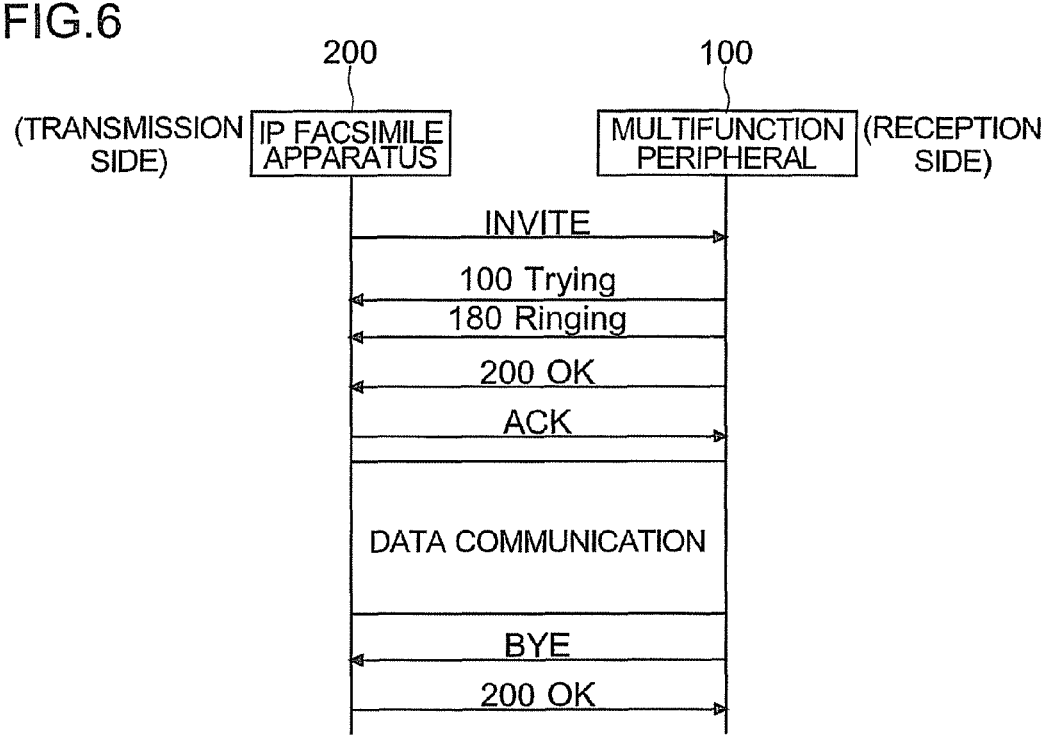
FIG. 6 is a diagram illustrating a communication sequence when the communication apparatus is in a reception enabled state.
Figure 7:
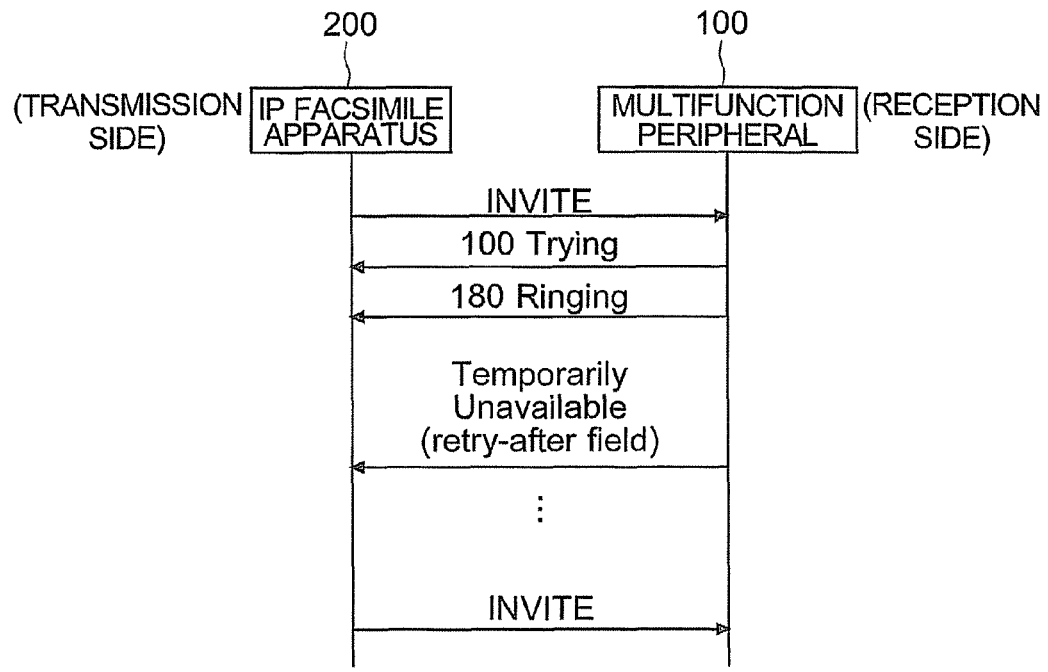
FIG. 7 is a diagram illustrating a communication sequence when the communication apparatus cannot temporarily receive.

Next, with reference to FIG. 6 and FIG. 7, a communication sequence of the communication apparatus 1 according to this embodiment is described.

The communication apparatus 1 (multifunction peripheral 100) of this embodiment performs facsimile communication via the IP network 300. Therefore, in the following description, a communication sequence according to Session Initiation Protocol (SIP) is described.

First, with reference to FIG. 6, an example of a flow of facsimile data (image data) reception by the communication apparatus 1 in a reception enabled state is described. The IP facsimile apparatus 200 (transmission side apparatus) that is starting the image data transmission sends an INVITE request to the communication unit 11 of the multifunction peripheral 100. The INVITE request is the request to start communication and is a request for communication so as to start and establish the session.

When receiving the INVITE request, the communication unit 11 of the multifunction peripheral 100 sends to the IP facsimile apparatus 200, as a response thereto, 100 Trying (a response for informing the transmission source that the reception side is performing various processes in response to reception of the INVITE request), 180 Ringing (a response for informing that the reception side is calling), and 200 OK response (a response for informing that the communication is accepted).

Then, the IP facsimile apparatus 200 sends back ACK to the OK response, and hence the session between the multifunction peripheral 100 and the IP facsimile apparatus 200 is established. When the session is established, image data is transmitted from the IP facsimile apparatus 200 to the multifunction peripheral 100 based on a data transmission protocol such as TCP or UDP.

When the image data transmission and reception are completed, the communication unit 11 of the multifunction peripheral 100 transmits a BYE request to the IP facsimile apparatus 200. In response to the BYE request, the IP facsimile apparatus 200 sends back an OK response to the communication unit 11. In this way, image data communication between the multifunction peripheral 100 and the IP facsimile apparatus 200 is completed (session completion).

Next, with reference to FIG. 6, an example of a flow of facsimile data (image data) reception by the communication apparatus 1 in a reception disabled state due to circumstances in the reception side is described. The IP facsimile apparatus 200 (transmission side apparatus) that is starting the image data transmission transmits the INVITE request to the communication unit 11 of the multifunction peripheral 100. When receiving the INVITE request, the communication unit 11 of the multifunction peripheral 100 transmits to the IP facsimile apparatus 200 a response such as 100 Trying or 180 Ringing as a response to the INVITE request.

Even if the request to start communication is received, when the communication apparatus 1 is in a communication disabled state, the communication apparatus 1 cannot start transmission and reception of image data with the IP facsimile apparatus 200 that requests communication. Therefore, as illustrated in FIG. 6, the communication unit 11 of the multifunction peripheral 100 transmits Temporarily Unavailable response to the IP facsimile apparatus 200 that has transmitted the request to start communication. The Temporarily Unavailable response is a notification notifying that communication is temporarily unavailable (communication disabled notification).

In this case, the communication unit 11 of the multifunction peripheral 100 transmits to the IP facsimile apparatus 200 a reception enabled time indicating a wait time until the reception becomes enable (valid) in the apparatus so that the request to start communication is sent again from the IP facsimile apparatus 200 by using a Retry-after header field in the Temporarily Unavailable response.

The IP facsimile apparatus 200 receives the Temporarily Unavailable response and waits for the reception enabled time described in the Retry-after header field, and then transmits the request to start communication (INVITE request) again to the communication unit 11 (redial).

(Flow of Facsimile Reception)

Figure 8:
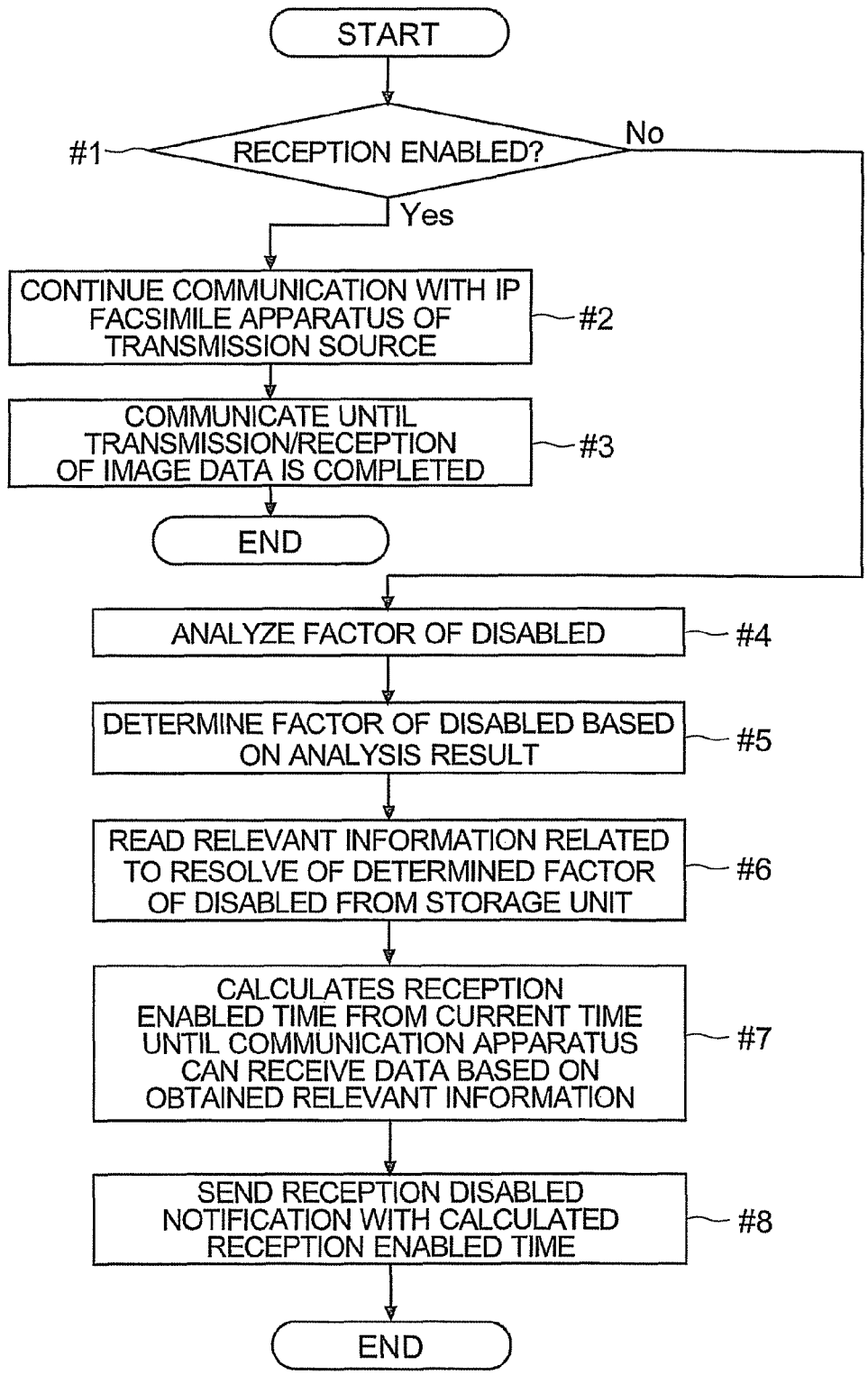
FIG. 8 is a flowchart illustrating a flow of image data reception in the communication apparatus.

Next, with reference to FIG. 8, there is described an example of a flow of the facsimile data (image data) reception by the communication apparatus 1 (multifunction peripheral 100) according to this embodiment.

First, the flow of FIG. 8 starts when the communication unit 11 (multifunction peripheral 100) receives the request to start communication (INVITE request) from the IP facsimile apparatus 200 of the transmission source.

Note that in the description of the communication apparatus 1 according to this embodiment, there is described an example where the main control unit 6 works as a processing unit that determines the reception disabled state, analyzes factors of the reception disabled state, obtains the relevant information corresponding to the factor, and calculates the reception enabled time. However, a part such as the communication control unit 110 other than the main control unit 6 may perform the process as the processing unit.

When the communication unit 11 receives the INVITE request, the main control unit 6 checks whether or not image data (facsimile data) can be received from the IP facsimile apparatus 200 (Step #1). Specifically, the main control unit 6 checks whether or not the communication storage area 74 is in the memory full state, and whether or not current mode is a priority mode. Note that the main control unit 6 determines that the communication storage area 74 is in the memory full state when a vacant capacity thereof is a predetermined capacity or smaller (for example, a remaining capacity is a few % or smaller).

Specifically, the main control unit 6 determines to be the reception disabled state when the memory full state has occurred or when the request to start communication is received from the IP facsimile apparatus 200 that is not a priority object during a priority mode. On the other hand, the main control unit 6 determines to be the reception enabled state when the memory full state has not occurred and when the apparatus is not in the priority mode.

Note that the priority mode is a mode in which the communication unit 11 gives priority to the image data transmission and reception job (communication) with the IP facsimile apparatus 200 having a high priority and does not perform the transmission and reception job (communication) with other IP facsimile apparatus 200. The operation panel 2 accepts setting of the priority mode in which communication with a specific IP facsimile apparatus 200 is given priority. The operation panel 2 accepts an address of the IP facsimile apparatus 200 with which the communication is given priority and setting of time for sustaining the priority mode (period from the current time point to the end of the priority mode). Then, the main control unit 6 determines to be the priority mode when being the time period of the priority mode.

Note that the main control unit 6 may determine whether or not the facsimile reception is enabled based on a condition other than the memory full state or the priority mode. For instance, the main control unit 6 may determine to be the facsimile reception disabled state when satisfying conditions such that a print error has occurred, or that the main control unit 6 has recognized occurrence of an error of a level to call a service person, and the main control unit 6 may determine to be the facsimile reception enabled state when none of the conditions is satisfied. In this case, the main control unit 6 checks a type of the error.

When the communication apparatus 1 is in the reception enabled state of the image data (Yes in Step #1), the communication unit 11 continues communication with the IP facsimile apparatus 200 of the transmission source (Step #2). Then, until the image data transmission and reception are completed, the communication unit 11 performs communication with the IP facsimile apparatus 200 (Step #3). Then, this flow is finished (END).

On the other hand, when the communication apparatus 1 is in the reception disabled state of the image data (No in Step #1), the main control unit 6 analyzes factors of the reception disabled state (Step #4). Then, the factor is determined based on a result of the analysis (Step #5). Then, the main control unit 6 reads out the relevant information corresponding to resolve of the determined factor from the storage unit 7 (Step #6).

Then, the main control unit 6 calculates the reception enabled time from the current time point until the communication apparatus 1 becomes the data reception enabled state based on the obtained relevant information (Step #7). Then, the main control unit 6 controls the communication unit 11 to transmit the reception disabled notification with the calculated reception enabled time to the IP facsimile apparatus 200 (Step #8). Then, this flow is finished.

The IP facsimile apparatus 200 that received the reception enabled time waits for the time defined by the reception enabled time from reception of the response including the reception enabled time, and afterwards transmits the request to start communication again to the communication apparatus 1 (communication unit 11) (redial).

(Analysis and Recognition of Factors of Reception Disabled State)

Next, with reference to FIG. 9, analysis of factors of the reception disabled state is described.

The main control unit 6 checks whether or not to be the memory full state, and whether or not to be the priority mode (Step #1 in FIG. 8). Then, the main control unit 6 determines that the image data reception is disabled when the communication storage area 74 is the memory full state or when the communication apparatus 1 is the priority mode.

As factors causing the reception disabled state due to the memory full state, there are running out of paper sheet, accumulation of received image data, untransmitted image data, print disable setting, and the like. Then, the main control unit 6 analyzes the factor of the memory full state causing the reception disabled state and recognizes the analyzed factor as the factor of the reception disabled state. Note that when the communication apparatus 1 is in the priority mode, the main control unit 6 analyzes and recognizes the priority mode as the factor of the reception disabled state.

1. Running out of Paper Sheet

First, running out of paper sheet is described. When the received image data is printed, the operation panel 2 accepts setting of deleting the printed received image data from the communication storage area 74. When this deleting setting is made, the HDD 73 deletes the printed received image data from the communication storage area 74.

However, when the printing cannot be performed because running out of paper sheet in the paper sheet feeder 4a, the received image data accumulated. The entire storage area of the HDD 73 is not used as the communication storage area 74. In addition, the communication storage area 74 has a limited size. Therefore, when many pages of image data are received, the one reception job may occupy almost all the capacity of the communication storage area 74.

Therefore, when the memory full state is generated, the main control unit 6 analyzes whether or not the setting of deleting the printed image data from the communication storage area 74 after printing the received image data and whether or not the running out of paper sheet has occurred. When the running out of paper sheet occurs, the main control unit 6 recognizes that the running out of paper sheet is the factor of the memory full state and the reception disabled state based on the memory full state. Note that the main control unit 6 determines whether or not the running out of paper sheet is generated based on an output of the paper sheet detection sensor S1 (see FIG. 2 and FIG. 3).

2. Accumulation of Received Image Data

Next, accumulation of received image data is described. In the multifunction peripheral 100 (communication apparatus 1) of this embodiment, the operation panel 2 accepts setting of keeping the printed received image data without deleting the same from the communication storage area 74 after the received image data is printed (see FIG. 10A). When this setting of keeping the reception job is made, the HDD 73 does not delete the printed received image data from the communication storage area 74 after printing.

However, when the image data received by the facsimile communication is not deleted and is accumulated, the communication storage area 74 may be fully occupied with the accumulated received image data.

Therefore, when the memory full state occurs, the main control unit 6 analyzes whether or not the setting of keeping the printed received image data in the communication storage area 74 is made, and the received image data is actually stored so as to occupy the communication storage area 74. When the received image data is stored so as to occupy the communication storage area 74, the main control unit 6 recognizes that the accumulation of received image data is the factor of the memory full state and the reception disabled state based on the memory full state.

3. Untransmitted Image Data

Next, the untransmitted image data is described. First, the operation panel 2 accepts setting of the time for performing the facsimile transmission. When this timer transmission setting is made, the communication storage area 74 keeps the image data to be transmitted until the transmission is completed. The communication unit 11 transmits the untransmitted image data stored in the communication storage area 74 to the set IP facsimile apparatus 200 at a timer set time measured by the clock unit 63. Then, the main control unit 6 controls to delete the transmitted image data from the communication storage area 74.

In addition, when the reception enabled time is notified from the IP facsimile apparatus 200 of the other party (when the other party is in the reception disabled state), the communication apparatus 1 waits for the reception enabled time, and afterwards transmits the request to start communication again (redial). The redial is repeated until the image data transmission is completed or is repeated a predetermined number of times. Then, the communication storage area 74 keeps the image data to be transmitted until the transmission is completed. After redialing, when the image data transmission is completed, the main control unit 6 controls to delete the transmitted image data from the communication storage area 74.

However, the timer transmission and image data of the transmission job waiting redial continues to occupy the communication storage area 74 until the transmission is completed. When the number of pages of the image data for timer transmission is large, only one job waiting transmission may occupy almost all the capacity of the communication storage area 74.

Therefore, when the memory full state is generated, it is analyzed whether or not the untransmitted image data is stored (kept) in the communication storage area 74 for timer transmission or redial. When the untransmitted image data is stored in the communication storage area 74, the main control unit 6 recognizes that the untransmitted image data is the factor of the memory full state and the reception disabled state based on the memory full state.

Other than that, as a factor causing the memory full state of the communication storage area 74, there is print inhibition in a specific time period. When the printing unit 10 is operated, power is consumed. After printing is completed, the multifunction peripheral 100 becomes a power saving mode. However, when printing is performed every time the image data is received, power consumption may be increased during a time period such as nights and holidays in which the multifunction peripheral 100 is not used. Therefore, the operation panel 2 of this embodiment accepts setting of inhibiting printing in a specific time period such as nights and holidays. When this setting is made, the image data received during the specific time period is stored in the communication storage area 74.

The image data received during the specific time period is deleted from the communication storage area 74 when the specific time period is finished and automatic printing is performed or by user's operation for deletion.

During the specific time period, the received image data are accumulated in the communication storage area 74. When a size of the received image data is large or when the number of reception times during the specific time period is large, the communication storage area 74 may be fully occupied with the image data received during the specific period.

Therefore, when the memory full state is generated, the main control unit 6 analyzes whether or not to be in the specific time period and whether or not the image data received in the specific time period is actually stored in the communication storage area 74. When the image data received in the specific time period is stored in the communication storage area 74, the main control unit 6 recognizes that the print inhibition in the specific time period is the factor of the memory full state and the reception disabled state based on the memory full state.

In this way, the main control unit 6 analyzes the factor causing the memory full state when the memory full state occurs. The main control unit 6 recognizes the factor of the reception disabled state (memory full state) based on the analysis.

(Obtaining of Relevant Information Corresponding to Running Out of Paper Sheet)

Next, with reference to FIG. 5 and FIG. 9, there is described obtaining and reading of relevant information corresponding to running out of paper sheet.

In the multifunction peripheral 100 (communication apparatus 1) of this embodiment, working hours can be set by the operation panel 2. In other words, the operation panel 2 accepts an input defining working hours in the place where the multifunction peripheral 100 is installed. Further, the input content defining the working hours is stored as supply time information i1 (relevant information) in the storage unit 7 (see FIG. 5). It is considered that even if the paper sheet runs out outside the working hours, the paper sheets are supplied when the working hours start so that the running out of paper sheet is resolved. When the paper sheet is supplied, printing is performed so that the printed image data is deleted. As a result, a vacant region is generated in the communication storage area 74. When the vacant region is generated, the memory full state is resolved.

Therefore, when the main control unit 6 recognizes that the running out of paper sheet is the factor of the reception disabled state as a result of the analysis, the main control unit 6 reads and obtains the supply time information i1 from the storage unit 7 as the relevant information corresponding to resolve of the reception disabled state (memory full state) based on the running out of paper sheet.

(Obtaining of Relevant Information Corresponding to Accumulation of Received Image Data)

Next, with reference to FIGS. 9, 10A, and 10B, obtaining and read out of the relevant information corresponding to the accumulation of received image data is described.

The operation panel 2 accepts setting of deleting the received image data. In other words, the operation panel 2 accepts an input of defining a time point to delete the received image data stored in the communication storage area 74. Screens illustrated in FIGS. 10A and 10B can be displayed on the display unit 21 by performing a predetermined operation on the touch panel unit 22 of the operation panel 2.

FIG. 10A illustrates an automatic deletion setting screen 81 for setting a time to delete the received image data after the image data reception. In the automatic deletion setting screen

81 illustrated in FIG. 10A, the operation panel 2 accepts deletion of each received image data at one of times after receiving the image data, which include one hour, four hours, one day (24 hours), and one week. Specifically, the user touches a display position of a check box of a desired time of deletion for checking the check box, so as to set the time to delete the received image data. In accordance with the setting, the main control unit 6 controls the communication storage area 74 to store the time and date when the image data is received (time and date is measured by the clock unit 63) together with the received image data so as to delete the received image data.

In addition, in the automatic deletion setting screen 81 of FIG. 10A, the operation panel 2 also accepts setting of not automatically deleting the received image data. When the setting of not automatically deleting the received image data is made, the user touches a display position of a check box of "not setting" so as to check the check box.

Further, in the automatic deletion setting screen 81 of FIG. 10A, the operation panel 2 accepts setting of deleting the received image data also after printing. When the setting of automatically deleting the received image data after printing, the user touches a display position of a check box of "delete after printing" so as to check the check box. The main control unit 6 deletes the image data after printing is competed when the setting of deleting the image data after printing is made. Note that the main control unit 6 may control the printing unit 10 to automatically print the image data received by facsimile communication without user's instruction or may control the printing unit 10 to print only the image data instructed to print by the user with the operation panel 2.

In addition, as illustrated in FIG. 10B, it is possible to make setting of deleting all the received image data at a certain time point. In an automatic deletion setting screen 82 of FIG. 10B, the operation panel 2 accepts the setting of deleting image data received by facsimile and stored in the communication storage area 74. In the automatic deletion setting screen 82 of FIG. 10B, the user can advance or delay the time point using a plus key K1 or a minus key K2 so as to set the time point to delete all the received image data by 1 minute.

The main control unit 6 checks the time by measuring by the clock unit 63 based on the content set in each setting screen of FIGS. 10A and 10B. When the set time comes, each received image data is deleted. Then, the storage unit 7 stores the deletion time information i2 (relevant information) that is the input content defining the time (time point) to delete the received image data as the relevant information of the factor of the accumulation of received image data (see FIG. 5). The main control unit 6 checks the deletion time information i2 so as to recognize which received image data in the communication storage area 74 is deleted at which time (time point). Then, by automatic deletion of the received image data, a vacant region is generated in the communication storage area 74, and hence the memory full state and the reception disabled state based on the memory full state may be resolved.

Therefore, when the main control unit 6 recognizes that the accumulation of received image data is the factor of the reception disabled state as a result of the analysis, the main control unit 6 reads and obtains the deletion time information i2 as the relevant information corresponding to resolve of the reception disabled state (memory full state) based on the accumulation of received image data.

(Obtaining of Relevant Information Corresponding to Untransmitted Image Data)

Figures 11, 12:
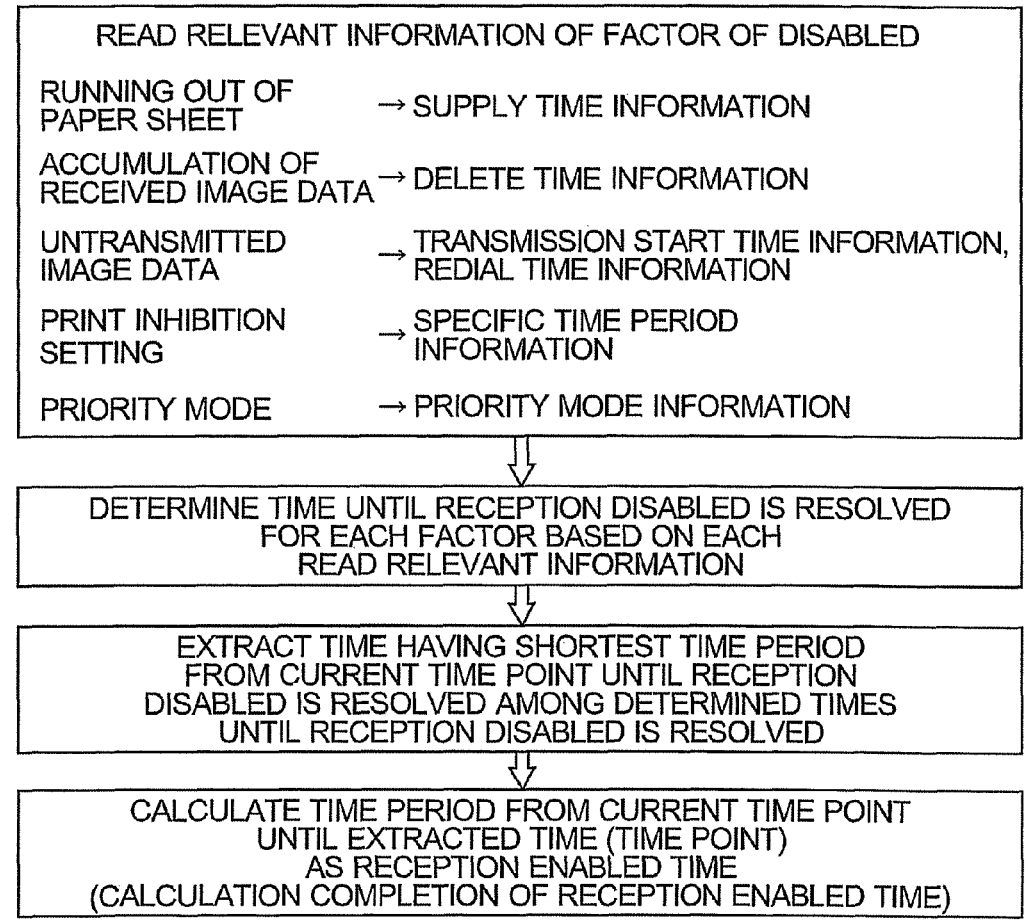
FIG. 11 is a diagram illustrating a timer transmission setting screen.
FIG. 12 is an explanatory diagram illustrating a flow of calculating a reception enabled state time.

Next, with reference to FIG. 11, obtaining and reading of the relevant information corresponding to accumulation of the untransmitted image data is described.

In the operation panel 2, it is possible to set a time point to transmit the image data. In other words, the operation panel 2 accepts an input defining a time point to start transmission of the transmission image data stored in the communication storage area 74. A timer transmission setting screen 83 of FIG. 11 can be displayed on the display unit 21 when a predetermined operation is performed on the touch panel unit 22 of the operation panel 2.

In the timer transmission setting screen 83, it is possible to set a time point to transmit the image data. The operation panel 2 accepts setting on the timer transmission setting screen 83 of a transmission start time point of the image data to be transmitted by facsimile stored in the communication storage area 74 (transmission start time point of the request to start communication). In the timer transmission setting screen 83, the user can advance or delay the time point using a plus key K3 or a minus key K4 so as to set the time point to transmit the image data by 1 minute. Then, the storage unit 7 stores the transmission start time information i3 indicating the image data transmission time point (relevant information) (see FIG. 5). The main control unit 6 controls the communication unit to transmit the image data whose transmission start time point is set among image data stored in the communication storage area 74 when the transmission start time point comes.

In addition, the image data waiting for redial also continues to occupy the communication storage area 74 until the transmission is completed. Therefore, the storage unit 7 stores also the redial time information i4 (relevant information) indicating the time (time point) to be the reception enabled state notified from the IP facsimile apparatus 200 of the transmission destination. Note that the main control unit 6 adds the reception enabled time indicated in the notification to the time point when the notification is received from the IP facsimile apparatus 200 in the reception disabled state, so as to determine the redial time information i4 indicating the time point to perform the redial, and controls the storage unit 7 to store the same.

The main control unit 6 checks the transmission start time information i3 and the redial time information i4 so as to recognize which untransmitted image data in the communication storage area 74 is transmitted at which time (time point). When the image data is automatically deleted after the transmission is completed, a vacant region is generated in the communication storage area 74, and hence the memory full state may be resolved. Therefore, when the main control unit 6 recognizes that the untransmitted image data is the factor of the reception disabled state as a result of the analysis, the main control unit 6 reads and obtains the transmission start time information i3 or the redial time information i4 as the relevant information corresponding to resolve of the reception disabled state (memory full state) based on the untransmitted image data.

(Obtaining of Relevant Information Corresponding to Print Inhibition in Specific Time Period)

Next, with reference to FIG. 5, obtaining and reading of the relevant information corresponding to the print inhibition in a specific time period is described.

The operation panel 2 can be used for setting the specific time period to inhibit printing. In other words, the operation panel 2 accepts and input of setting a day of week or date and time as the specific time period to inhibit printing.

Then, the set content defining the specific time period is stored as the specific time period information i5 in the storage unit 7 (see FIG. 5). When the specific time period is finished, the image data received during the specific time period is automatically printed so that the image data is deleted, and hence a vacant region is generated in the communication storage area 74. When the vacant region is generated, the memory full state may be resolved. Therefore, when the main control unit 6 recognizes that the print inhibition in the specific time period is the factor of the reception disabled state as a result of the analysis, the main control unit 6 reads and obtains the specific time period information i5 as the relevant information corresponding to resolve of the reception disabled state (memory full state) based on the print inhibition in the specific time period.

(Obtaining of Relevant Information Corresponding to Priority Mode)

Next, with reference to FIG. 5, obtaining and reading of the relevant information corresponding to the priority mode is described.

On the operation panel 2, it is possible to perform setting about the priority mode. For instance, the operation panel 2 accepts setting of an address of the IP facsimile apparatus 200 to which communication priority is given and a time to maintain the priority mode (from the current time point until the priority mode is finished).

Then, the set content about the priority mode is stored as the priority mode information i6 in the storage unit 7 (see FIG. 5). When the priority mode is completed, the restriction of performing the facsimile communication only with a specific IP facsimile apparatus 200 is canceled. In other words, the state where the facsimile communication can be performed with the IP facsimile apparatus 200 other than the communication priority object is restored, and the factor of the reception disabled state is canceled. Therefore, when the main control unit 6 recognizes that the priority mode is the factor of the reception disabled state as a result of the analysis, the main control unit 6 reads and obtains the priority mode information i6 as the relevant information corresponding to resolve of the reception disabled state based on the priority mode.

(Calculation of Reception Enabled Time)

Next, with reference to FIG. 12, calculation of the reception enabled time is described. Note that FIG. 12 illustrates details of Step #6 and Step #7 in FIG. 8.

The main control unit 6 checks whether or not the memory full state is generated and whether or not to be the priority mode, so as to check whether or not the communication apparatus 1 (multifunction peripheral 100) is in the image data reception enabled state. In addition, the main control unit 6 analyzes factors causing the reception disabled state. In addition, the storage unit 7 stores the relevant information for each factor. Then, the main control unit 6 reads the relevant information and calculates the reception enabled time (wait time until redial) corresponding to the determined factor based on a result of the analysis of the factors.

When the reception enabled time is calculated, the main control unit 6 reads the relevant information of the factor based on a result of the analysis of the factor. Specifically, when it is analyzed that the factor of the reception disabled state is the running out of paper sheet, the main control unit 6 reads out the supply time information i1 from the storage unit 7. In addition, when it is analyzed that the factor of the reception disabled state is the accumulation of received image data, the main control unit 6 reads out the deletion time information i2 from the storage unit 7. In addition, when it is analyzed that the factor of the reception disabled state is based on the untransmitted image data, the main control unit 6 reads out the transmission start time information i3 and the redial time information 14 from the storage unit 7. In addition, when it is analyzed that the factor of the reception disabled state is based on the print disable setting, the main control unit 6 reads out the specific time period information i5 from the storage unit 7. In addition, when it is analyzed that the factor of the reception disabled state is the priority mode, the main control unit 6 reads out the priority mode information i6 from the HDD 73 of the storage unit 7.

Further, the main control unit 6 determines a time when the reception disabled state is resolved for each factor based on the read relevant information. For instance, when the factor of the reception disabled state is the running out of paper sheet, the main control unit 6 determines that a time when the paper sheets are supplied (work start time) is the time when the reception disabled state is resolved based on the supply time information it In addition, when the factor of the reception disabled state is the accumulation of received image data, the main control unit 6 determines that a time when the received image data is deleted is the time when the reception disabled state is resolved based on the deletion time information i2. In addition, when factor of the reception disabled state is the untransmitted image data, the main control unit 6 determines that a time when the transmission of the untransmitted image data is started plus a time necessary for the transmission based on a size of the untransmitted image data is the time when the reception disabled state is resolved based on the transmission start time information i3 and the redial time information i4. In addition, when the factor of the reception disabled state is the print disable setting, the main control unit 6 determines that a time when the print inhibition is resolved is the time when the reception disabled state is resolved based on the specific time period information i5. In addition, when the factor of the reception disabled state is the priority mode, the main control unit 6 determines that a time when the priority mode is canceled is the time when the reception disabled state is resolved based on the priority mode information i6.

As a result of the analysis, when it is recognized that there are a plurality of factors of the reception disabled state, the main control unit 6 reads out the relevant information and determines the time when the reception disabled state is resolved for each factor. Then, the main control unit 6 extracts the time having a shortest time period from the current time point until the reception disabled state is resolved among the times when the reception disabled state is resolved. For instance, when it is analyzed that there are factors of the accumulation of received image data and the untransmitted image data, the time (time point) when the reception disabled state is resolved after the received image data is deleted is compared with the time (time point) when the reception disabled state is resolved after the untransmitted image data is transmitted, so that a time closest to the current time point is extracted. Then, the main control unit 6 calculates the time period from the current time point to the extracted time (time point) as the reception enabled time.

Note that in order to redial in a state where the reception disabled state is securely resolved, the main control unit 6 may extract one of a time having a second shortest time period from the current time point until the reception disabled state is resolved, a time having a third shortest time period, and a time having a shorter time period then the longest time period from the current time point until the reception disabled state is resolved among the determined plurality of times when the reception disabled state is resolved.

As a result, when the reception disabled state is resolved most early by resolving the running out of paper sheet, the main control unit 6 calculates a time period from the current time point to the work start time point as the reception enabled time. In addition, when the reception disabled state is resolved most early by deleting the received image data, the main control unit 6 calculates a time period from the current time point to the time point when the received image data is deleted as the reception enabled time. In addition, when the reception disabled state of the communication apparatus 1 is resolved most early by deleting the untransmitted image data, the main control unit 6 calculates a time period from the current time point until the transmission start time point based on the transmission start time information i3 or the redial time information i4 plus a necessary time for transmission determined based on a size of the untransmitted data as the reception enabled time. Note that the necessary time should be determined by the main control unit 6 or the communication unit 11 based on a communication speed set on the operation panel 2 in advance or a data transmission speed to the network measured by the communication unit 11. In addition, when the reception disabled state is resolved most early by finishing the priority mode, the main control unit 6 calculates a time period from the current time point until the priority mode is finished as the reception enabled time.

In this way, the communication apparatus 1 according to this embodiment includes the storage unit 7 including the communication storage area 74 for storing the communication data with the communication apparatus of the other party (IP facsimile apparatus 200), for storing the relevant information indicating the time when the reception disabled state is resolved (the supply time information i1, the deletion time information i2, the transmission start time information i3, the redial time information i4, the specific time period information i5, and the priority mode information i6) for each of the factors of the reception disabled state, the processing unit (main control unit 6) configured to determine whether or not the data reception from the communication apparatus of the other party is enabled, to analyze the factors of the reception disabled state so as to determine the current factor of the reception disabled state among the plurality of factor candidates, to obtain the relevant information corresponding to the determined one or more factors from the storage unit 7, and to calculate the reception enabled time until the data reception is enabled after the reception disabled state is resolved based on the obtained relevant information, and the communication unit 11 configured to perform data transmission and reception using the network, to transmit the notification (Temporarily Unavailable response) including the instruction of the wait time until the communication apparatus of the other party sends the request to start communication (INVITE request) again when the data reception from the communication apparatus of the other party is disabled, and to transmit the reception enabled time calculated by the processing unit as the wait time.

In this way, considering various factors and relevant information, the time until being the reception enabled state can be notified to the communication apparatus of the other party (IP facsimile apparatus 200). Then, after being back to the reception enabled state, it is possible to make the communication apparatus of the other party to send the request to start communication (redial) without delay (promptly). Therefore, the data that was not received because of the reception disabled state can be received promptly after the reception enabled state is restored. Therefore, the process (for example, a process of an order acceptance document) can be promptly started based on the received data. In addition, the data that was not transmitted because of the reception disabled state is transmitted promptly after the reception enabled state is restored. Therefore, unreached data hardly occurs so that a trouble such as a loss of order chance hardly occurs. In addition, the storage area of the memory for communication of the transmission side apparatus is not occupied for long period by data waiting transmission. Therefore, a load of the transmission side apparatus can be reduced so that the memory full state hardly occurs in the transmission side apparatus.

In addition, when determining a plurality of factors of the reception disabled state, the processing unit (main control unit 6) determines the time when the reception disabled state is resolved for each factor based on each of the read relevant information, extracts the time having a shortest time period from the current time point until the reception disabled state is resolved among the determined times when the reception disabled state is resolved, and calculates a time period from the current time point to the extracted time as the reception enabled time. In this way, the calculated reception enabled time becomes a shortest time period until the data reception is enabled. Therefore, the data that was not received because of the reception disabled state can be received in as short time as possible. In addition, the data that was not transmitted because of the reception disabled state can be transmitted in as short time as possible.

In addition, the communication apparatus 1 includes the printing unit 10 that performs printing based on the data received from the communication apparatus of the other party (IP facsimile apparatus 200). When running out of paper sheet occurs in the printing unit 10, the storage unit 7 stores the data received from the communication apparatus of the other party in the communication storage area 74 and deletes the printed data from the communication storage area 74. The processing unit (main control unit 6) determines that the data reception is disabled when the vacant capacity of the communication storage area 74 is a predetermined capacity or smaller as the memory full state, and calculates the reception enabled time based on the supply time information i1 indicating the time when the paper sheets are supplied stored as the relevant information in the storage unit 7. In this way, when the printing is started by supplying the paper sheets, the memory full state is resolved by deleting the reception image data in the communication storage area 74. When the reception enabled state is restored, the transmission side apparatus sends the request to start communication. In this way, when the reception enabled state is restored by supplying the paper sheets, the data that was not received because of the reception disabled state is promptly received. Further, the operation panel 2 accepts setting whether or not to delete the received image data after printing the same. The processing unit deletes the image data after completing the printing when the setting of deleting the image data after printing is made. In this way, the user can set whether or not to delete the printed data from the communication storage area 74, and hence it is possible to provide a communication apparatus that can perform arbitrary setting in accordance with user's intention.

In addition, the storage unit 7 deletes a part or a whole of the data stored in the communication storage area 74 at a predetermined deletion time. The processing unit (main control unit 6) determines that the data reception is disabled when the vacant capacity of the communication storage area 74 is a predetermined capacity or smaller as the memory full state, and calculates a time period from the current time point to the deletion time as the reception enabled time. In this way, when the data is automatically deleted from the communication storage area 74, a vacant area is generated in the communication storage area 74 so that the memory full state is resolved. When the reception enabled state is restored, the transmission side apparatus sends the request to start communication. In this way, when the reception enabled state is restored by deleting the accumulated received data, the data that was not received because of the reception disabled state is promptly received. Further, the operation panel 2 accepts the input of determining a time when the image data stored in the communication storage area 74 is deleted. When the set time comes, the processing unit deletes the image data stored in the communication storage area 74. In this way, the user can set the time when the printed data is deleted from the communication storage area 74, and hence it is possible to provide the communication apparatus that can set arbitrarily in accordance with user's intention.

In addition, the storage unit 7 stores the untransmitted data to be transmitted to the communication apparatus of the other party (IP facsimile apparatus 200) in the communication storage area 74, and deletes the untransmitted data from the communication storage area 74 when the transmission is performed. The processing unit (main control unit 6) determines that the data reception is disabled when the vacant capacity of the communication storage area 74 is a predetermined capacity or smaller as the memory full state, and calculates the reception enabled time by adding the time necessary for transmitting the data determined based on a size of the untransmitted data to the time period from the current time point to the transmission start time of the untransmitted data. In this way, by deleting the untransmitted data after transmitting the same from the communication storage area 74, a vacant area is generated in the communication storage area 74 so that the memory full state is resolved. When the reception enabled state is restored, the transmission side apparatus sends the request to start communication. In this way, when the untransmitted data stored in the communication storage area 74 is transmitted so that the reception enabled state is restored, the data that was not received because of the reception disabled state is promptly received. Further, the operation panel 2 accepts the setting of the image data transmission start time point stored in the communication storage area 74. The processing unit controls the communication unit to transmit the image data for which the transmission start time point (timer transmission) is set among the image data stored in the communication storage area 74 when the transmission start time point comes.

In addition, when the communication unit 11 is in the priority mode in which the transmission and reception job with the communication apparatus of the other party (IP facsimile apparatus 200) having higher priority is given priority so that the other transmission and reception job is not performed, the processing unit (main control unit 6) determines that data reception from a communication apparatus 1 other than the communication apparatus 1 having high priority is disabled, and calculates the reception enabled time, which is a time period from the current time point until the priority mode is canceled. In this way, when the reception enabled state is restored from the reception disabled state based on the intentional communication exclusion, the transmission side apparatus sends the request to start communication. In this way, when the priority mode is canceled so that the reception enabled state is restored, the data that was not received because of the reception disabled state is promptly received.

In addition, the image forming apparatus (multifunction peripheral 100) includes the communication apparatus 1 according to this embodiment. In this way, it is possible to provide the image forming apparatus (multifunction peripheral 100) that can receive the data that was not received because of the reception disabled state promptly after the reception enabled state is restored. In addition, it is possible to provide the image forming apparatus that transmits the data that was not transmitted because of the reception disabled state to the transmission side apparatus promptly after the reception enabled state is restored. Therefore, it is possible to provide the image forming apparatus that can transmit and receive data without delay with little load on the other party.

The image forming apparatus (multifunction peripheral 100) of this embodiment includes the communication apparatus 1 described above.

The embodiment of the present disclosure is described above, but the scope of the present disclosure is not limited to this. It is possible to modify variously within the scope without deviating from the spirit of the present disclosure.

What is claimed is:

1. A communication apparatus comprising:
a storage unit including a communication storage area for storing communication data with a communication apparatus of the other party;
a processing unit configured to determine whether or not data reception from the communication apparatus of the other party is enabled so that,
when the processing unit determines that reception is disabled, the processing unit checks whether or not the communication apparatus is in a memory full state where a vacant capacity of the communication storage area equals a predetermined capacity or smaller and whether or not the communication apparatus is in a priority mode so that,
when the communication apparatus is in the priority mode, the processing unit determines that the priority mode is a factor of disabled reception and, when the communication apparatus is in the memory full state, the processing unit determines which of running out of paper sheet, accumulation of received image data, untransmitted image data, and print disable setting is a factor of disabled reception;
a communication unit configured to perform data transmission and reception using a network; and
an operation panel for accepting settings,
wherein
the storage unit
stores relevant information for determining a time when disabled reception is resolved for each of factors of disabled reception, namely running out of paper sheet, accumulation of received image data, untransmitted image data, and print disable setting, and the priority mode, and
stores the untransmitted data to be transmitted to the communication apparatus of the other party in the communication storage area and deletes the untransmitted data from the communication storage area after the transmission is performed,
the processing unit obtains the relevant information corresponding to the determined factor from the storage unit, and calculates a reception enabled time until data reception becomes enabled by resolving disabled reception based on the obtained relevant information,
the communication unit transmits a notification including an instruction of a wait time until the communication apparatus of the other party sends a request to start communication again when data reception from the communication apparatus of the other party is disabled, and transmits the reception enabled time calculated by the processing unit as the wait time,
when the communication apparatus is in the memory full state and in addition the untransmitted image data is stored in the communication storage area, the processing unit
determines that the untransmitted image data is the factor of disabled reception based on the memory full state, calculates as the reception enabled time a time period obtained by adding a required time necessary for data transmission to a time period from the current time point until a transmission start time of the untransmitted image data, and determines the required time based on a size of the untransmitted image data and a communication speed previously set on the operation panel or a data transmission speed to the network measured by the communication unit.

2. The communication apparatus according to claim 1, wherein when the processing unit determines a plurality of factors of the reception disabled state, the processing unit determines a time when the reception disabled state is resolved for each factor based on the read relevant information, extracts a time having a shortest time period from a current time point to the time when the reception disabled state is resolved, and calculates a time period from the current time point to the extracted time as the reception enabled time.

3. The communication apparatus according to claim 1, further comprising a printing unit for performing printing based on the data received from the communication apparatus of the other party, wherein the storage unit stores the data received from the communication apparatus of the other party in the communication storage area when running out of paper sheet occurs in the printing unit, and deletes the printed data from the communication storage area, and the processing unit determines that the data reception is disabled when a vacant capacity of the communication storage area is a predetermined capacity or smaller as a memory full state, and calculates the reception enabled time based on the supply time information indicating a time when the paper sheets are supplied stored in the storage unit as the relevant information.

4. The communication apparatus according to claim 3, further comprising an operation panel for accepting setting whether or not to delete the received image data after printing the same, wherein the processing unit deletes the image data after completing printing the same when the setting of deleting the image data after printing is made.

5. The communication apparatus according to claim 1, wherein the storage unit deletes a part or a whole of the data stored in the communication storage area at a predetermined deletion time, and the processing unit determines that the data reception is disabled when a vacant capacity of the communication storage area is a predetermined capacity or smaller as a memory full state, and calculates a time from the current time point to the deletion time as the reception enabled time.

6. The communication apparatus according to claim 5, further comprising an operation panel for accepting an input indicating a time of deleting the image data stored in the communication storage area, wherein the processing unit deletes the image data stored in the communication storage area when the set time comes.

7. The communication apparatus according to claim 1, further comprising an operation panel for accepting setting of a transmission start time point of image data stored in the communication storage area, wherein the processing unit controls the communication unit to transmit image data for which the transmission start time point is set among image data stored in the communication storage area when the transmission start time point comes.

8. The communication apparatus according to claim 1, wherein when the communication unit is in a priority mode in which transmission and reception job with a communication apparatus of the other party having a high priority is given priority so that other transmission and reception job is not performed, the processing unit determines that data reception from a communication apparatus other than the communication apparatus having a high priority is disabled and calculates a time period from the current time point until the priority mode is canceled as the reception enabled time.

9. A control method for a communication apparatus, comprising the steps of:

storing communication data with a communication apparatus of the other party in a communication storage area;

determining whether or not data reception from the communication apparatus of the other party is enabled;

checking, when it is determined that reception is disabled, whether or not the communication apparatus is in a memory full state where a vacant capacity of the communication storage area equals a predetermined capacity or smaller and whether or not the communication apparatus is in a priority mode;

determining, when the communication apparatus is in the priority mode, that the priority mode is a factor of disabled reception;

determining, when the communication apparatus is in the memory full state, which of running out of paper sheet, accumulation of received image data, untransmitted image data, and print disable setting is a factor of disabled reception;

performing data transmission and reception using a network;

storing relevant information for determining a time when disabled reception is resolved for each of factors of disabled reception, namely running out of paper sheet, accumulation of received image data, untransmitted image data, and print disable setting, and the priority mode;

storing the untransmitted data to be transmitted to the communication apparatus of the other party in the communication storage area and deleting the untransmitted data from the communication storage area after the transmission is performed;

obtaining the relevant information corresponding to the determined one or more factors factor from the storage unit;

calculating a reception enabled time until data reception becomes enabled by resolving disabled reception based on the obtained relevant information;

transmitting to the communication apparatus of the other party a notification including an instruction of a wait time until the communication apparatus of the other party sends a request to start communication again when the data reception from the communication apparatus of the other party is disabled;

transmitting the calculated reception enabled time as the wait time;

determining, when the communication apparatus is in the memory full state and in addition the untransmitted image data is stored in the communication storage area, that the untransmitted image data is the factor of disabled reception based on the memory full state, and calculating as the reception enabled time a time period obtained by adding a required time necessary for data transmission to a time period from the current time point until a transmission start time of the untransmitted image data; and determining the required time based on a size of the untransmitted image data and a communication speed previously set on the operation panel or a data transmission speed to the network measured by the communication unit.

* * * * *